UNITED STATES PATENT OFFICE.

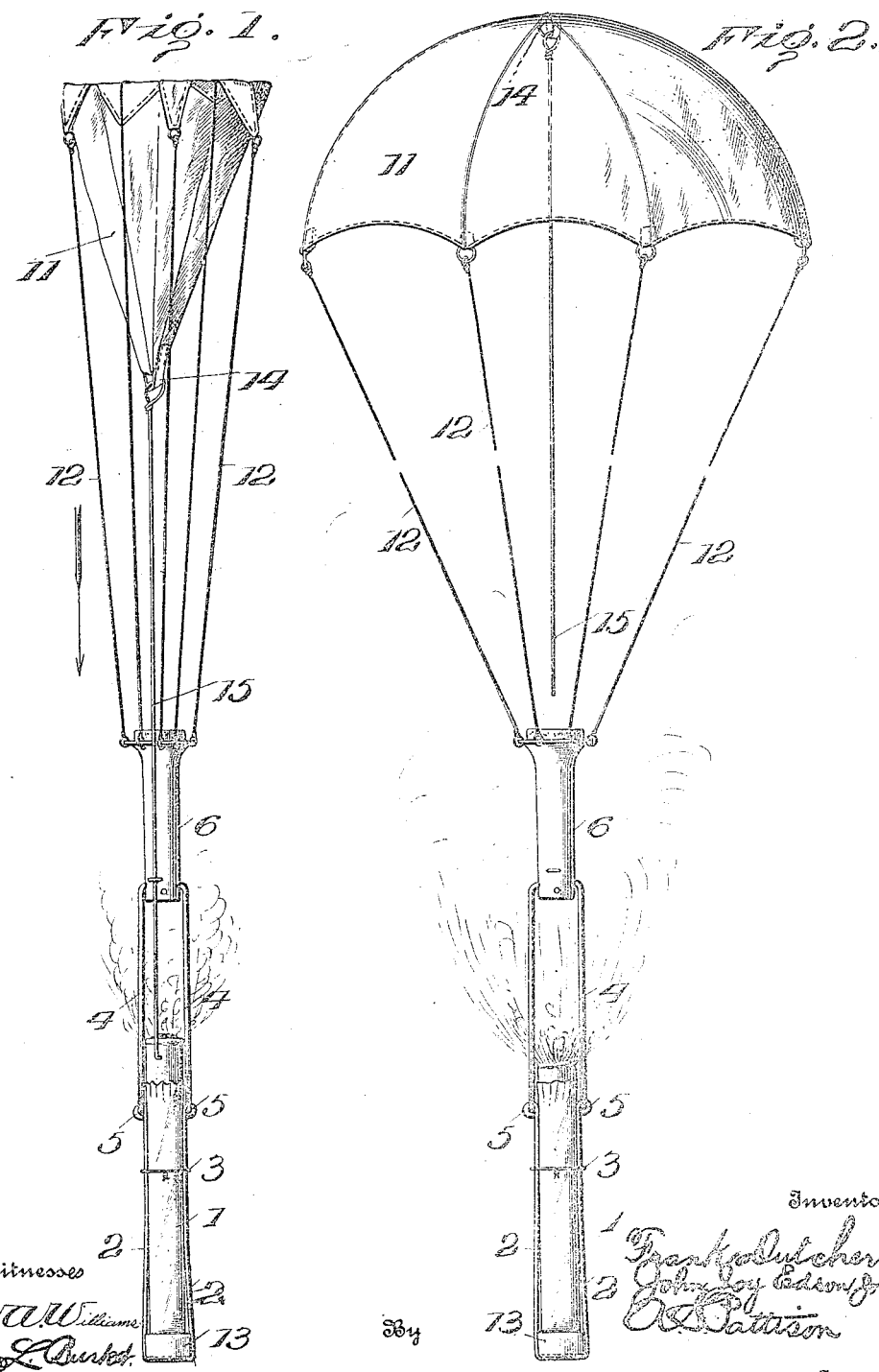

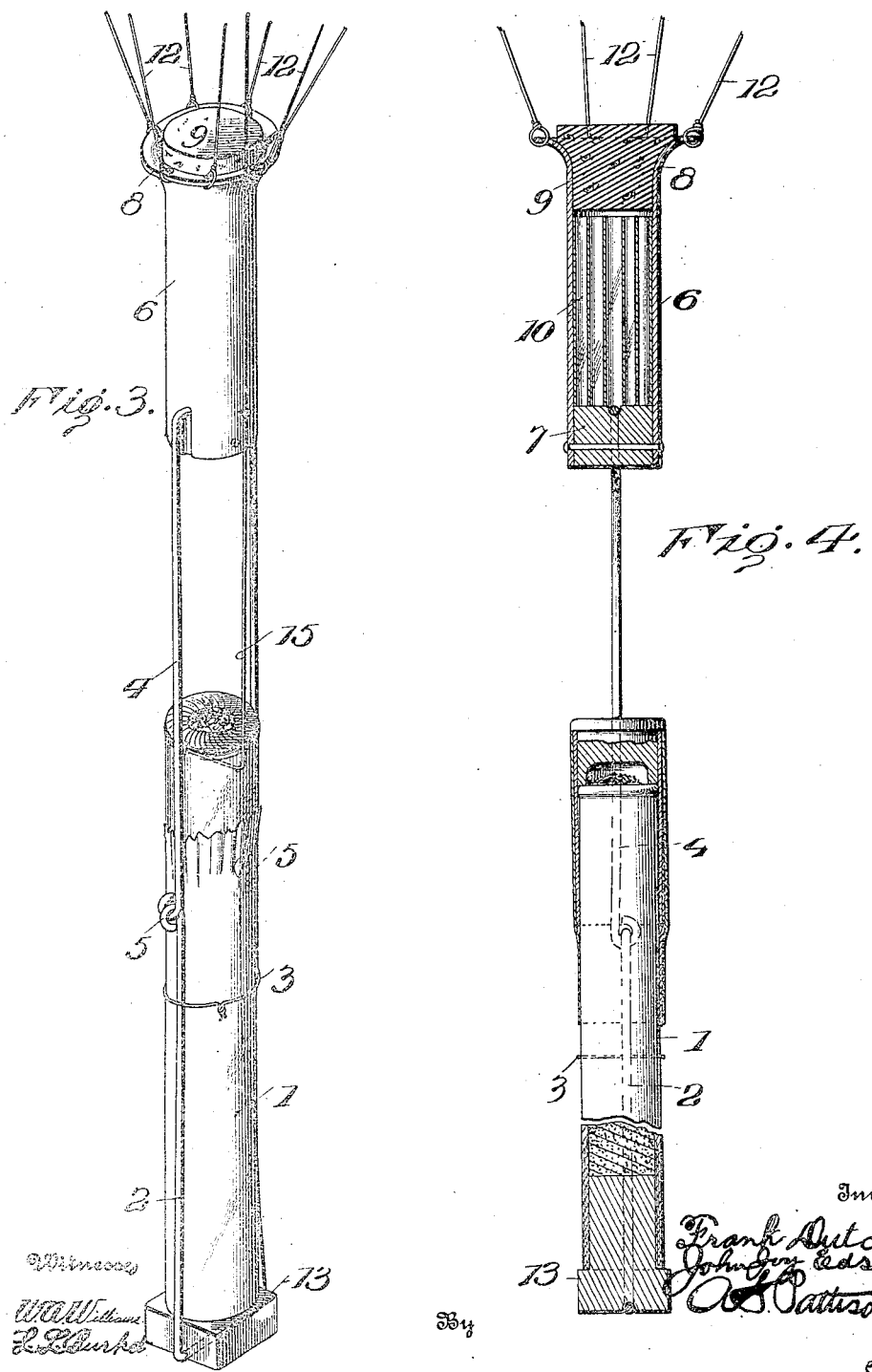

FRANK DUTCHER, OF VERSAILLES, AND JOHN JOY EDSON, JR., OF PITTSBURGH, PENNSYLVANIA, ASSIGNORS TO CENTRAL RAILWAY SIGNAL COMPANY, OF PITTSBURGH PENNSYLVANIA, A CORPORATION OF NEW JERSEY.

AERIAL SIGNAL.

1,178,304.  Specification of Letters Patent.  Patented Apr. 4, 1916.

Application filed November 8, 1915. Serial No. 60,459.

*To all whom it may concern:*

Be it known that we, FRANK DUTCHER and JOHN JOY EDSON, Jr., citizens of the United States, residing at Versailles and Pittsburgh, in the county of Allegheny and State of Pennsylvania, have invented certain new and useful Improvements in Aerial Signals, of which the following is a specification, reference being had therein to the accompanying drawing.

This invention relates to improvements in aerial signals.

The object of this invention is to provide a message-carrying signal so that information may be dropped to the desired army or person without the airship stopping.

When desired information has been obtained in scouting or, otherwise by an airship, and it is desired to convey this information to an army, person, or persons, the information is attached within the message-carrying compartment of the signal, and the signal is so constructed that it will fall rapidly until near the ground at which time a parachute attached to the signal is automatically opened out, and the message-carrying signal will fall from that point slowly to the ground, thus preventing injury to persons, and destruction or possible loss of the message.

In the accompanying drawings, Figure 1 is a side elevation of a message-bearing signal, the same being shown in the position it assumes when it is first dropped from the airship. Fig. 2 is a side elevation showing the parachute opened out when the signal is near the ground. Fig. 3 is an enlarged perspective view of the signal and message-carrying elements. Fig. 4 is a partial, longitudinal sectional view of Fig. 3.

In carrying out this invention a signal 1 is provided, and this signal is adapted to burn to produce at night a visible signal, and if a day signal, it will throw out a dense smoke so that it will be plainly visible from the ground either at night or in the daytime. Preferably there will be day and night signals, and the signal composition to produce the light at night will be different from the signal composition to produce the smoke for day use. This signal 1 is attachable within a U-shaped frame 2, preferably made of wire, as shown, and it is placed within the U-shaped frame or holder 2 and secured therein by a single wrapping or wire 3. An inverted U-shaped wire frame 4 is connected to the holder part 2 by having the adjacent ends of the frames 2 and 4 provided with eye hinges or connections 5. Carried at the upper end of the frame 4 is a message-carrying receptacle 6 which has its lower end permanently closed by a suitable plug 7, preferably composed of wood. The upper end 8 of the receptacle 6 is preferably, though not necessarily, flared outward, and is adapted to be closed by a cork, or other suitable stopper 9. The message 10 is rolled and placed within this receptacle 6, and the upper end of the receptacle closed by the stopper 9, thus holding the message safely within the receptacle. A parachute 11 is attached to the upper end of the receptacle 6 by suitable fine wires or cord 12. A suitable iron plug 13 is at the lower end of the signal 1 for the purpose of weighting that end and causing the signal to maintain the positions shown in Figs. 1 and 2 when it is in operation.

In Fig. 1 the signal is shown in its position when it first begins to drop and the parachute has its center 14 pulled down within the wires 12 to an inverted conical shape and has its apex or center 14 connected with the signal 1 by means of a connection 15. This connection 15 has its lower end attached to the upper end of the signal 1 and the connection 15 is of a fusible metal and will be of such character and size that it will sever under the heat from the burning signal within a pre-determined period of time and thus release the center 14 of the parachute when the parachute will immediately assume its open position shown in Fig. 2, and from that time the message-bearing signal will slowly descend to the earth.

The airship approaching the point where it is desired the message-bearing signal should fall, it is necessary that when the signal is released, it should fall rapidly and be little influenced by air currents until it is close to the earth, and in that way the signal can be prevented from drifting away from the point it is desired to deliver it. If the parachute was set in operation at the beginning, the signal would fall comparatively slow and would drift away, possibly into the hands of the enemy instead of reaching the army, or regiment it is intended for. By constructing the signal so that it will fall very rapidly until near the earth and then slowly, it is possible to insure the delivery of the message approximately at the desired point, and thus have it in the hands of the desired persons without the airship descending for that purpose.

The automatic parachute release, or fusible connection will be of such a nature that it will act substantially like a time fuse so that the airship being at a pre-determined height indicated by the instrument carried by it, for instance three thousand feet, the message bearing signal will fall very rapidly to within one or two hundred feet of the ground and then the automatic connection will give way and the parachute open up, causing the message-bearing signal to slowly descend to the earth in a way to prevent injury to persons and destruction or loss to the message.

The signal 1, as a night signal, will be of the well known type of railway signal fusee which are made to burn different colors, for instance, red, yellow or green. And in this way it can be indicated whether the message came from or was intended for the artillery, cavalry or infantry, or some other branch of the army.

In the type of signal here used, the end or case of the signal is burned away as the composition burns, so that instead of having the connection 6 of a fusible metal, it can be connected to the signal near its upper end so that when the signal is burned down to that point the connection is released. The broad idea of this part of the invention is the automatic releasing of the parachute so that it will open out after the signal has dropped a pre-determined distance.

The signal 1 is of such a character that it will burn for a pre-determined length of time; viz., five, ten, or fifteen minutes, as may be desired, and it gives forth a very brilliant light. In this way the signal will continue to burn after it falls, so that as it falls it will indicate to the army, regiment or company that a message is being dropped to them, and the message can then be located by reason of the continuance of the burning of the signal.

The railway signal fusee, which is here used, is of such a nature that it will stand severe shocks without being extinguished; will burn in snow-drifts, and in puddles of water, all of which is well known to those skilled in the art and need not be more fully referred to herein.

By means of a device of this kind, messages can be delivered by scouting parties to the desired army without the necessity of descending and thus interrupting the scouting work for that purpose either in the daytime or at night.

Having thus fully described our invention what we claim and desire to secure by Letters Patent is:

1. An aerial signal comprising a burning element, a parachute supported thereabove, means for holding the parachute closed and adapted to be released by the burning of the signal to permit the parachute to open up, for the purpose described.

2. An aerial signal comprising a burning element, a collapsible parachute connected with the burning element, means for holding the parachute collapsed, said means released substantially a pre-determined time after the burning element is lighted, for the purpose described.

3. An aerial signal comprising a burning element, a parachute supported thereabove, means for holding the parachute closed when the signal is first dropped, and means for releasing the parachute to permit it to open up, substantially a pre-determined time after the signal is dropped, for the purpose described.

4. An aerial signal comprising a burning element, a message-carrying element, a parachute supported above the burning element, means for holding the parachute closed when the signal is first dropped, and means influenced by the burning element to release the parachute and permit it to open substantially at a pre-determined time after the burning element is lighted.

5. An aerial signal comprising a burning element, a message-bearing element, a parachute above the burning element, a fusible connection between the parachute and the burning element for holding the parachute closed, whereby the connection is broken substantially a pre-determined time after the burning element is lighted.

6. An aerial signal comprising a frame, a burning signal connected to the lower portion of the frame, a message receiving receptacle at the upper portion of the frame, a parachute connected to the upper portion of the frame, fusible means connected to the parachute and adjacent the burning end of the burning element to hold the parachute closed, whereby the parachute is released to open out, substantially a pre-determined time after the burning element is lighted.

7. An aerial signal comprising a frame, a railway signal fusee connected therewith with its burning end up, a message-bearing receptacle connected with the frame, a parachute connected with the frame, and means for holding the parachute closed and permitting it to open out a pre-determined time after the fusee is lighted.

8. An aerial signal comprising an upper and lower frame hinged together, a fusee supported in the lower frame, a message-bearing element in the upper frame, a parachute connected to the upper frame, and means for holding the parachute closed, said means effected by the burning of the fusee and caused to release the parachute and permit it to open out, substantially a pre-determined time after the lighting of the fusee, for the purpose described.

9. An aerial signal comprising a vertically arranged fusee having its burning end up and its opposite lower end weighted, a message bearing element, a parachute connected with the signal, and means controlled by the burning fusee for holding the parachute closed and permitting it to open out, substantially a pre-determined time after the fusee is lighted.

10. An aerial signal comprising an upper and a lower frame hinged together, a fusee connected with the lower frame with its burning end up, a message bearing receptacle connected to the upper frame, means for closing the receptacle, a parachute connected with the upper end of the receptacle, and means controlled by the burning fusee, and holding the parachute closed, and permitting it to open out, substantially a pre-determined time after the fusee is lighted.

In testimony whereof we hereunto affix our signatures in the presence of two witnesses.

FRANK DUTCHER.
JOHN JOY EDSON, Jr.

Witnesses:
R. W. JUNKER,
G. M. LEONARD.